United States Patent [19]

Jarck

[11] 3,710,834
[45] Jan. 16, 1973

[54] TREE HARVESTING APPARATUS AND METHOD

[76] Inventor: Walter Jarck, 306 Grady Drive, Rock Hill, S.C. 29730

[22] Filed: Dec. 4, 1970

[21] Appl. No.: 95,031

[52] U.S. Cl. .......................... 144/309 AC, 144/3 D
[51] Int. Cl. ............................................. A01g 23/02
[58] Field of Search ............... 144/2 Z, 3 D, 309 AC

[56] References Cited

UNITED STATES PATENTS

| | | | |
|---|---|---|---|
| 2,981,301 | 4/1961 | Busch et al. | 144/3 D |
| 3,059,677 | 10/1962 | Busch et al. | 144/3 D |
| 3,531,235 | 9/1970 | Boyd et al. | 144/3 D |

*Primary Examiner*—Gerald A. Dost
*Attorney*—Parrot, Bell, Seltzer, Park & Gibson

[57] ABSTRACT

A tree being harvested is severed by a shear and felled in a predetermined direction so as to be caught when the falling tree trunk reaches a generally horizontal position. The generally horizontal trunk of a felled tree is thereafter longitudinally advanced to the shear while having the limbs removed therefrom and, by movement of the shear to a generally vertical bucking position, severed into portions of desired predetermined length.

14 Claims, 11 Drawing Figures

INVENTOR:
WALTER JARCK

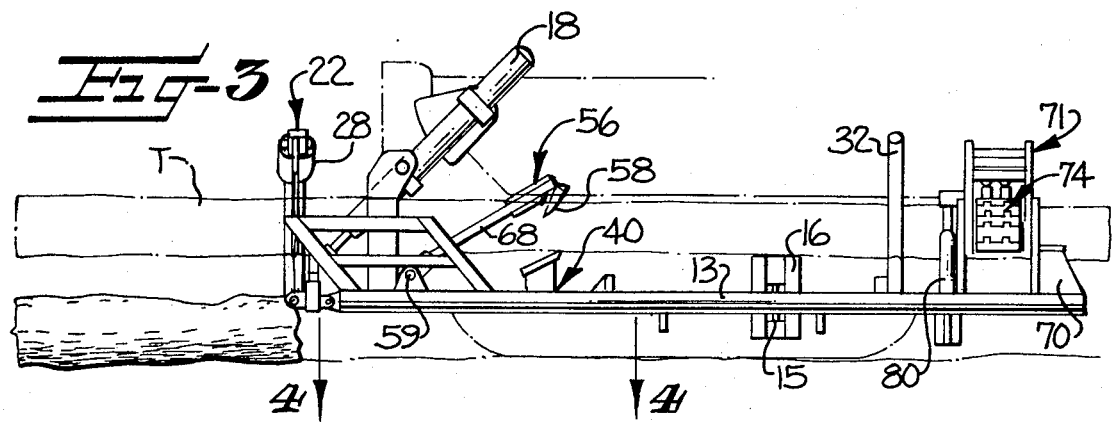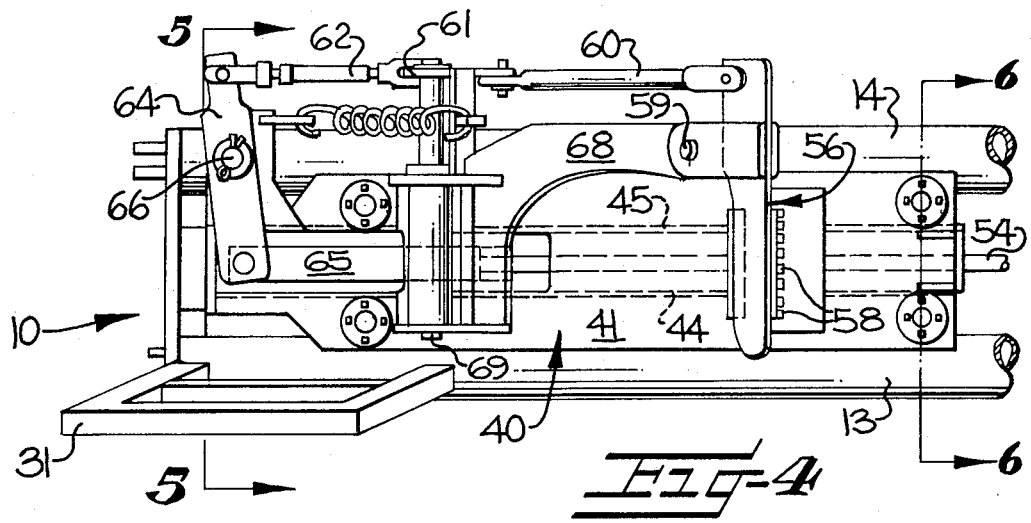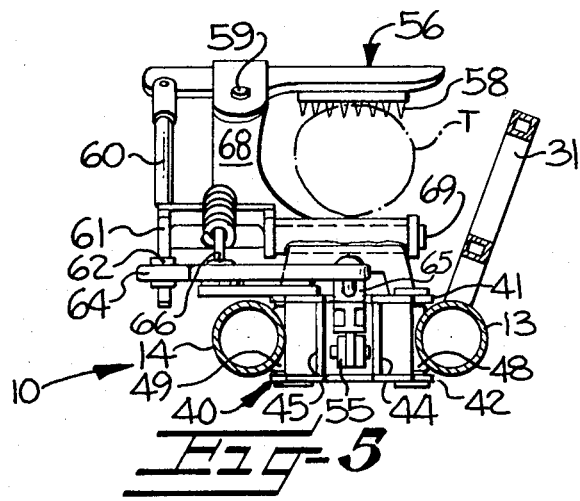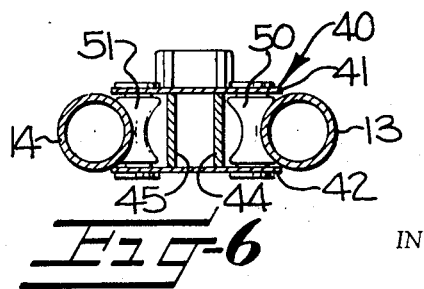

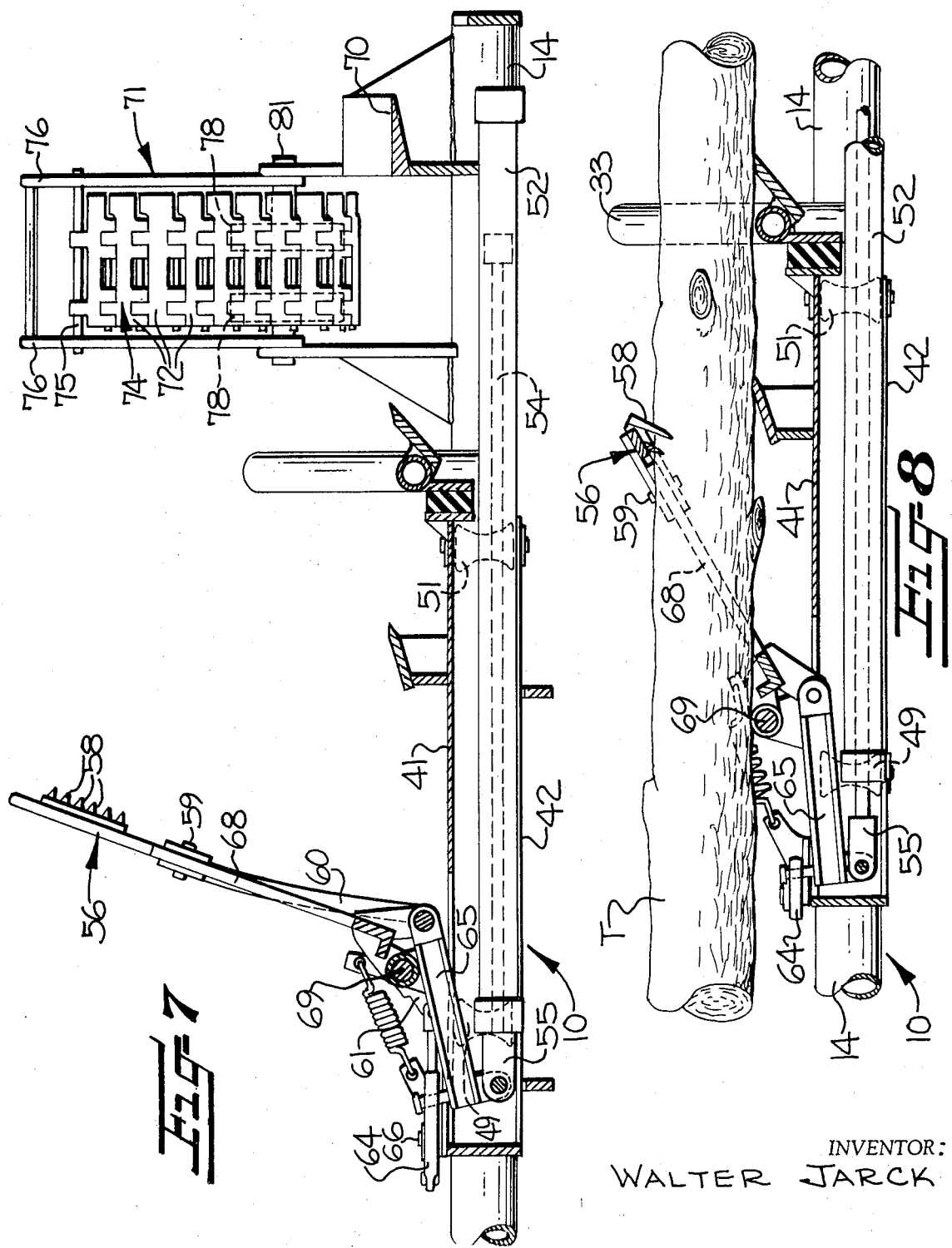

INVENTOR:
WALTER JARCK

TREE HARVESTING APPARATUS AND METHOD

Processing of timber for supply to a paper mill or other similar timber using industries typically involves cutting of standing trees and severing of the tree trunks into relatively short, predetermined lengths. Efforts at mechanizing tree harvesting operations heretofore have included gathering such trunk portion lengths or "shortwood sticks" from the forest land, through the use of specialized hauler trucks and/or tractors equipped with loaders and pallets or racks for accommodating shortwood sticks. Through the adoption of such haulers, that portion of a tree harvesting operation which has come to require the greatest expenditure of man hours has become the initial felling and bucking of trees. Conventionally, such tree harvesting has been accomplished by crews of men using chain saws.

It has heretofore been proposed that the productivity of a worker felling and bucking trees may be substantially improved by the provision of mechanical tree harvesting apparatus having a movable frame which is positioned generally vertically and adjacent an upright tree to grip the tree prior to severing thereof and thereafter moved as desired during subsequent bucking of the severed tree trunk.

Understandably, tree harvesting apparatus of this type is relatively complicated to construct and operate and is both relatively expensive to construct and relatively demanding in the maintenance attention required, limiting the usefulness of such apparatus to those organizations which cannot afford the relatively great capital and operating expenses involved.

In view of the above discussion, it is an object of the present invention to improve the operating efficiency of a worker felling and bucking trees without requiring unduly burdensome capital investment and operating expense. In realizing this object of the present invention, tree harvesting apparatus is provided which avoids the difficulties and deficiencies heretofore introduced through reliance upon a vertically orientated frame for engaging the truck of a tree to be harvested. In apparatus according to the present invention, a tree to be harvested is freely felled, without restraint as to the orientation of the tree as the tree falls to a generally horizontal position.

A further object of the present invention is to facilitate mechanization of all operations involved in harvesting of trees for shortwood sticks, through the introduction of a method which may be widely practiced by small or medium sized contractors engaged in such tree harvesting. In accordance with the present invention, advantage is taken over the relatively simple procedures involved where a standing tree is felled in a predetermined direction and is caught as the trunk of the tree reaches a generally horizontal position, without attempting to restrain the tree during its fall to the generally horizontal position.

It is a further object of the present invention to provide a simplified tree harvesting apparatus which can be added as an attachment to existing tractor equipment or can be manufactured as a complete self-contained unit.

Some of the objects and advantages of the invention having been stated, others will appear as the description proceeds, when taken in connection with the accompanying drawings, in which--

FIG. 3 is a view of a portion of the apparatus illustrated in FIG. 2, following bucking of a tree trunk into portions;

FIG. 4 is an enlarged plan view of a portion of the apparatus illustrated in FIG. 3, taken generally along the line 4—4 in that Figure;

FIG. 5 is an end elevation, in partial section, of the apparatus of FIG. 4, taken generally along the line 5—5 in that Figure;

FIG. 6 is a view similar to FIG. 5, taken generally along the line 6—6 in FIG. 4;

FIG. 7 is an enlarged side elevation, partially in section, of the apparatus of FIGS. 1 and 2, taken generally along the line 7—7 in FIG. 1;

FIG. 8 is a view similar to FIG. 7, illustrating elements of the present invention during longitudinally advancing of a felled tree trunk;

Figure 1:
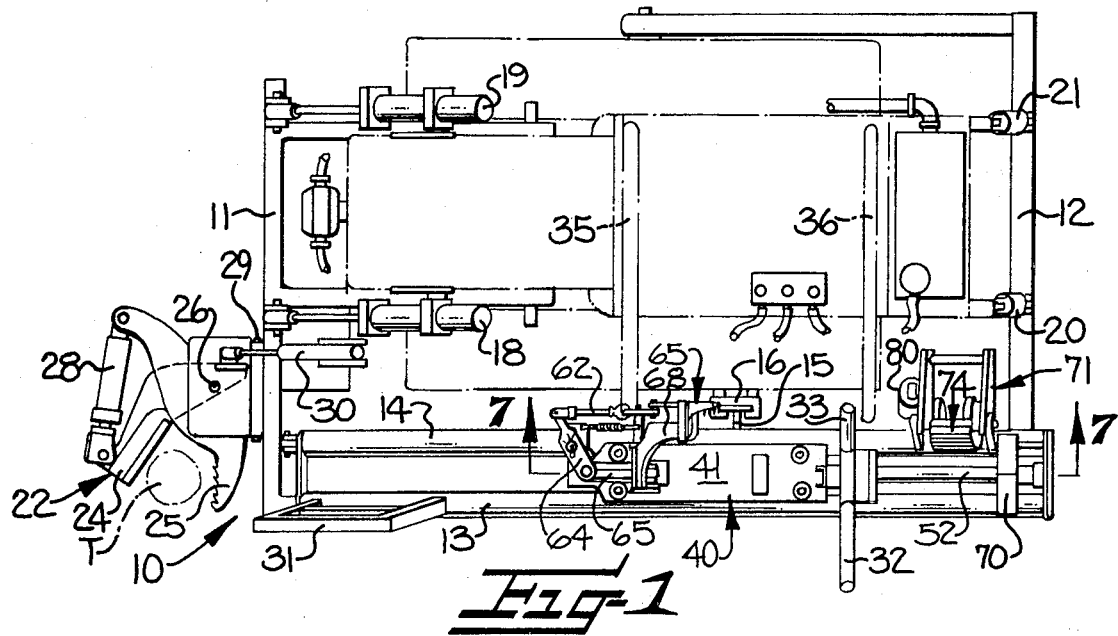
FIG. 1 is a plan view of a tree harvesting apparatus in accordance with the present invention, illustrating the cooperation thereof with a self-propelled vehicle and a tree to be harvested.
Figure 2:
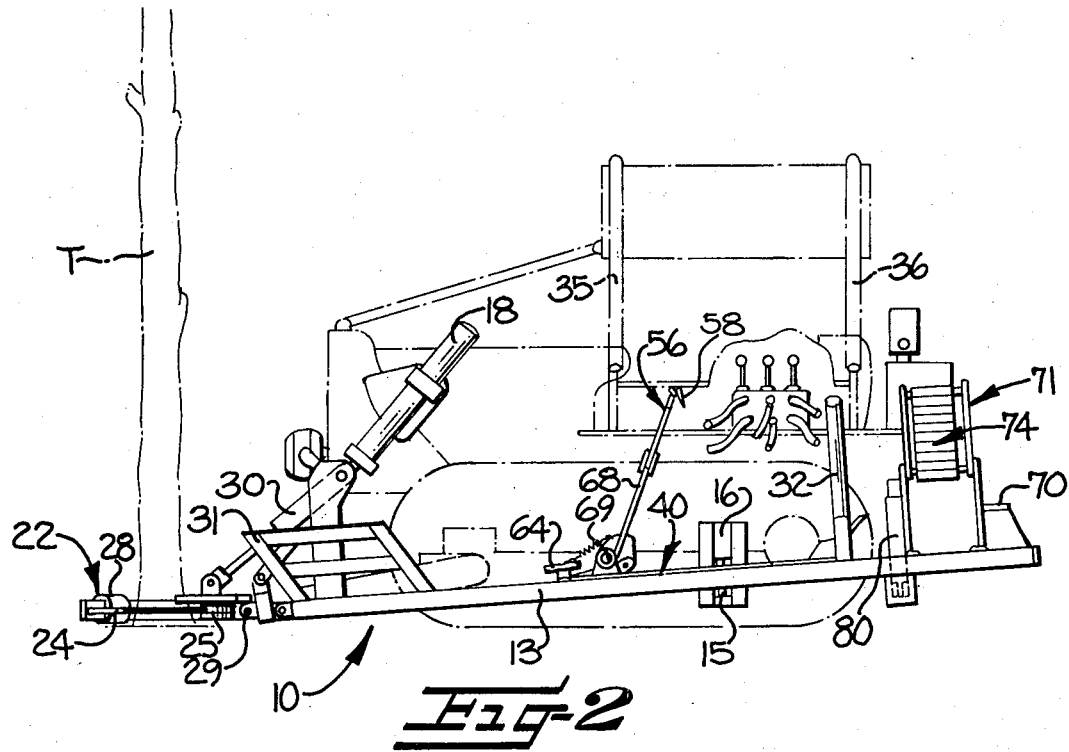
FIG. 2 is a side elevation view of the apparatus of FIG. 1.

While one practical embodiment of an apparatus for harvesting trees in accordance with the present invention is particularly illustrated in the accompanying drawings, and the method of the present invention will hereinafter be described with reference thereto, it is contemplated that the apparatus of the present invention may be varied from that particularly illustrated while remaining within the scope and spirit of the present invention. Thus, the following disclosure with particular reference to the accompanying drawings is to be taken as illustrative and for the purpose of permitting ready practice of the present invention. In particular, while the apparatus of the present invention is disclosed in conjunction with a crawler tractor (indicated in phantom lines FIGS. 1 – 3) the present invention is contemplated as having usefulness with a wide range of vehicles which may or may not be self-propelled.

The tree harvesting apparatus of the present invention is generally indicated at 10, and comprises frame means supported for movement over forest land to be harvested. In the particular embodiment illustrated, the frame means includes a forward cross-frame member 11, a rear cross-frame 12, and a pair of elongate tubular side frame members 13, 14 forming a generally horizontal cradle means. In the particular form illustrated, the frame means is supported from a crawler tractor (as briefly mentioned above) which thus provides self-propelled vehicle means for supporting the frame means and for moving the same over the forest lands to be harvested. The present invention contemplates that the frame means may be supported by a rubber tired vehicle or other similar means or may in fact provide a frame for receiving an engine and running gear of any suitable type.

For purposes to be made more clear by the disclosure which follows, the frame means desirably is arranged for limited movement relative to the self-propelled vehicle means. In particular, one of the elongate side frame members 14 has a projecting bar member 15 extending therefrom to engage a pivot guide 16 mounted from the vehicle means. Through the provision of suitable fluid pressure actuated cylinders 18, 19 engaging the forward crossframe 11 and 20, 21 engaging the rear cross-frame 12, the frame means may be moved over a limited range of generally horizontal positions including a depressed position (FIG. 2) and a normal position (FIG. 3).

Mounted adjacent the forward end of the frame means is a shear means 22 including a blade 24 and an anvil 25. The blade 24 is movable relative to the anvil 25 by means of a pivotal connection provided by a pivot pin 26 and an actuating hydraulic cylinder 28. With application of hydraulic pressure fluid to the cylinder 28, the blade 24 is moved relative to the anvil 25 in such a manner to engage a tree T which is being harvested.

The shear means 22 is mounted to the forward crossframe member 11 for oscillating movement about a pivot axis defined by a pivot pin 29 and between a generally horizontally tree felling position (FIG. 2) and a generally vertical tree bucking position (FIG. 3). In the felling position (FIG. 2), the shear means 22 is operable for severing a standing tree T adjacent the base thereof and felling the severed tree rearwardly toward the side frame members 13, 14. In order to ensure that the remaining stump left in the forest land is of minimum size, severing of a standing tree preferably occurs with the frame means in the depressed position of FIG. 2, in order that the blade 24 and anvil 25 of the shear means act as close as possible to true ground level. Through the provision of an appropriate hydraulic fluid actuated cylinder 30, the shear means may be raised from the generally horizontal tree felling position to the generally vertical bucking position (FIG. 3) wherein downward movement of the blade 24 against the anvil 25 may sever a longitudinally advancing tree trunk into portions, as disclosed more fully hereinafter.

In operation of the shear means 22 while in the felling position, a standing tree is felled rearwardly toward the frame means, to be caught by horizontal cradle means provided by the frame means and including guiding bars 31, 32, 33. Preferably, in order to ensure that the freely falling tree, in moving to the generally horizontal position, is received by the horizontal cradle means, stationary guide means in the form of guide bars 35, 36 are provided on the self-propelled vehicle to cooperate with the horizontal cradle means. It is to be understood that the provision for free fall of the severed tree T from the upright position to the generally horizontal position is relied upon in the present invention for avoiding the need for a generally upright frame to be brought into engagement with the upright tree, and thereby contributes to the important advantages of the present invention.

In order to cooperate with the shear means 22 (while the same is in the tree bucking position) in severing a generally horizontal tree trunk into portions of predetermined length, means are mounted on the frame means for movement relative thereto and for longitudinally advancing the generally horizontal trunk of the felled tree of the shear means 22. Such means includes a carriage 40 mounted on the side frame members 13, 14 for oscillation longitudinally thereof. Preferably, the carriage 40 comprises an upper plate member 41, a lower plate member 42, and vertical spacer plate members 44, 45 extending therebetween. A plurality of mounting rollers, 48, 49, 50, 51 are mounted for rotation relative to the upper and lower plate members 41, 42 and engage the surfaces of the side frame members 13, 14 for guiding the carriage means 40 in oscillation back and forth therealong. Oscillation of the carriage means 40 occurs in response to hydraulic fluid flowing to an actuating cylinder 52, (FIG. 7 and 8) having an extensible piston rod 54 terminating in an actuating head 55.

In order to advance the trunk of a felled tree with carriage means 40, trunk gripping means are mounted thereon for movement with the carriage 40 back and forth along the side frame members 13, 14. In accordance with the present invention, the trunk gripping means comprises a gripping frame member 56 having toothed means 58 mounted thereon for gripping the trunk of a felled tree during movement of the carriage means 40 toward the shear means 22. By the provision of appropriate means, disclosed hereinafter, gripping frame member 56 is moved between a retracted position removed from the path of a falling tree (FIGS. 1 and 2) and a tree gripping position overlying the generally horizontal trunk of a felled tree (FIGS. 4 and 5) in response to oscillation of the carriage means 40 back and forth along the side frame members 13, 14.

In particular, the gripping frame member 56 is mounted for pivotal movement about an axis defined by a mounting bolt 59 in response to movement of a first operating rod 60. The first operating rod 60 is coupled through pivotal connections and a bell crank 61, to a second operating rod 62, which reciprocates with motion of a control lever member 64 to which the second rod 62 is coupled. Movement of the control lever member 64 occurs upon movement of the cylinder actuating head 55 relative to the carriage means 40.

In particular, the stroke of the piston rod 54 of the actuating cylinder 52 which reciprocates the carriage means 40 along the side frame members 13, 14 is slightly greater than the extent of movement permitted for the carriage means 40 and a certain freedom of motion is permitted therebetween. Thus, with the actuating head 55 fully retracted (FIG. 7), a certain amount of lost motion occurs between initiating of advance movement of the head 55 and forward movement of the carriage means 40. Upon initial forward movement of the head 55 (to the position of FIG. 8), such movement is transmitted to an intermediate actuating member 65, pivotally coupled to an end of the operating lever member 64 remote from the coupling of the second rod 62 thereto. Thus, the initial movement of the actuating head 55 pivots the operating lever member 64 about a generally vertical axis defined by a pin 66 and thereby pivots the gripping frame member 56 about the pivot pin 59.

It is to be noted that movement of the intermediate coupling member additionally pivots a mounting frame member 68 about a generally horizontal axis defined by a pivot pin 69, thereby moving the gripping frame member 56 between a raised position (FIGS. 1 and 2) and lowered position (FIGS. 4 and 5).

Following advancing movements of the carriage means 40 toward the shear means 22, and movement of a predetermined length of the generally horizontal trunk 10 of a severed tree beyond the shear means 22, the shear is actuated to sever the predetermined length of shortwood stick from the trunk T, such as a five foot portion. thereafter, the application of hydraulic pressure to the actuating cylinder 52 is reversed, drawing the carriage means 40 rearwardly along the sideframe members 13, 14. Upon initiation of such backward movement, the intermediate actuating member first moves with the head 55, moving the trunk gripping member to a partially raised position and thereby permitting movement of the carriage 40 relative to the generally horizontal trunk T of a felled tree.

Repeated reciprocation of the carriage 40 thus alternately grips and releases the trunk T to advance the same in incremental lengths.

Figures 9, 10:
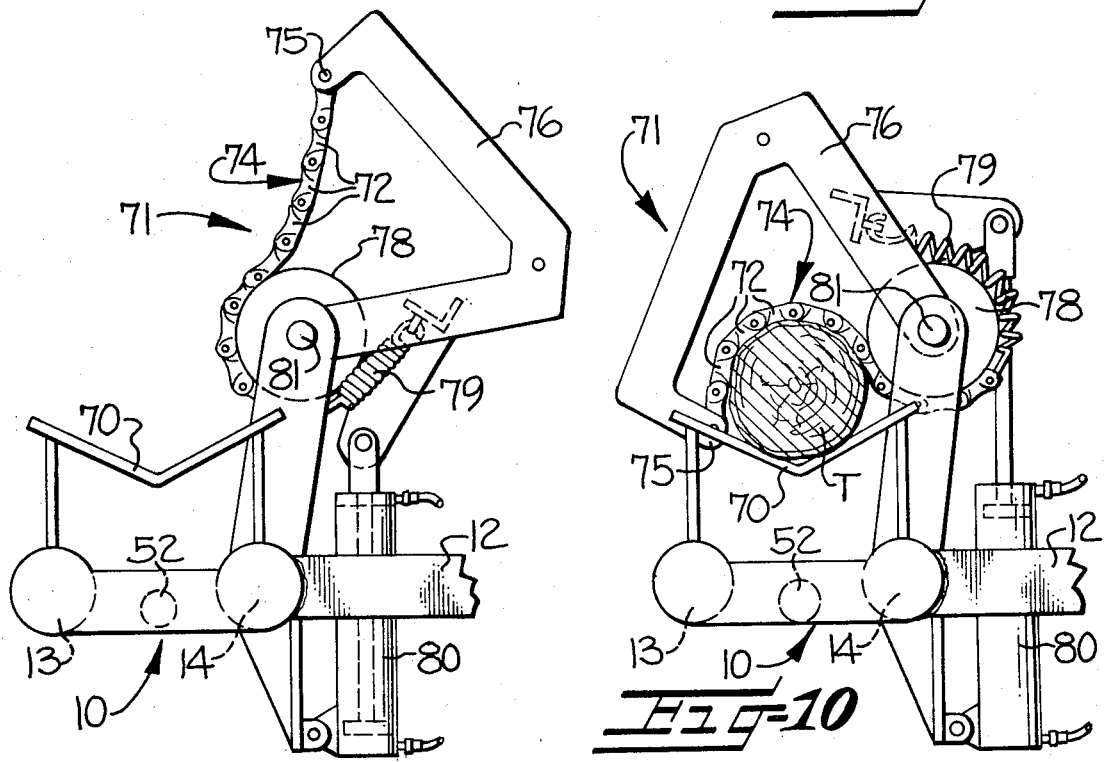
FIG. 9 is an end elevation view, partically in section, of a delimber portion of the apparatus of the present invention, taken generally along the line 9—9 in FIG. 7.
FIG. 10 is a view similar to FIG. 9, showing the cooperation of the delimber with a felled tree trunk.

As will be understood, the tree when felled typically has a number of limbs projecting from the trunk T thereof. In harvesting the tree, it is desirable to remove the limbs from the trunk as the same is bucked into shortwood sticks. In the apparatus of the present invention, delimbing is accomplished by delimbing means provided in the form of cutter means for severing limbs from the trunk as the same is advanced longitudinally with the carriage means 40. Desirably, the cutter means provided includes stationary cutter means 70 adjacent the rearward end of the frame means which underlies the horizontal trunk of a felled tree (FIGS. 9 and 10) for engaging and severing limbs. Limbs on other portions of the trunk preferably are severed by flexible cutter means generally indicated at 71 and mounted for movement between a withdrawn position removed from a path of a tree falling onto the cradle means (FIG. 9) and an operating position at least partially encircling the horizontal trunk of a felled tree (FIG. 10). The flexible cutter means 71 includes a plurality of cutter links 72 joined together into a cutter chain 74 which extends from an outboard extremity 75 of an actuating arm 76 around a mounting roller 78 to be secured by a tensioning spring 79. Movement of the flexible cutter means 71 between the withdrawn and operating position is controlled by a suitable hydraulic cylinder 80 coupled to the moving frame 76 for pivoting the same about an axis defined by a mounting shaft 81.

Figure 11:
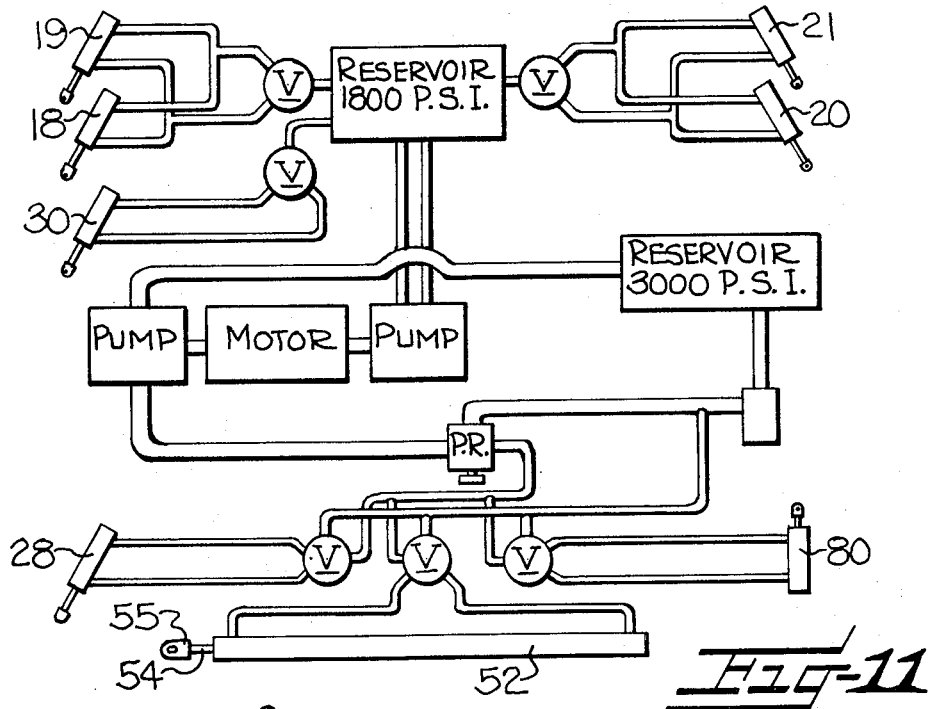
FIG. 11 is a schematic diagram of a hydraulic system controlling the operaticn of the apparatus of the present invention.

Referring now to the schematic illustration of a hydraulic circuit shown in FIG. 11, the various pressure fluid cylinders described above as actuating portions of the apparatus of the present invention are there identified by the reference characters used above. As illustrated, valve means are provided for controlling relative communication between the various cylinders and corresponding ones of two pressure reservoirs. By means of a suitable motive power source, illustrated as a motor, corresponding pressure fluid pumps are driven to maintain appropriate hydraulic fluid pressures such as 1,800 psi and 3,000 psi. While the schematic circuit of FIG. 11 is included herein to ensure full disclosure of the present apparatus, it will be recognized by persons skilled in the art of machine design that various modifications to the control means there illustrated may be undertaken, including replacement of the hydraulic circuit with similar means actuated by some other selected mechanical arrangement.

In the drawings and specification, there has been set forth a preferred embodiment of the invention, and although specific terms are employed, they are used in a generic and descriptive sense only and not for purposes of limitation.

What is claimed is:

1. Apparatus for harvesting trees comprising:
    frame means having a cradle means for catching the trunk of a freely falling tree as the falling tree reaches a generally horizontal position and including elongate side frame members defining a longitudinal axis,
    means mounted on said elongate side frame members for movement relative thereto and for advancing the generally horizontal trunk of a felled tree longitudinally of said side frame members and along said axis while the trunk is otherwise maintained substantially in alignment with said axis and the position it reached on freely falling, and
    shear means mounted adjacent one end of said frame means in general alignment with said side frame members and for oscillating movement between a generally horizontal tree felling position and a generally vertical tree bucking position,
    said shear means, frame means and advancing means cooperating for severing a standing tree adjacent the base thereof, felling the severed tree into the horizontal cradle means and bucking the trunk of the felled tree into portions by advancing the trunk toward the shear means from the position at which it is received when felled.

2. Apparatus according to claim 1 wherein said shear means is mounted at the forward end of said frame means for felling trees rearwardly toward said cradle means and further wherein said trunk advancing means functions for advancing the horizontal trunk of a felled tree forwardly of said frame means whereby bucking of the longitudinally advancing tree trunk into portions simultaneously deposits such portions at a common location forwardly of said frame means.

3. Apparatus according to claim 1 further comprising self-propelled vehicle means for supporting said frame means and for moving the same over forest land to be harvested.

4. Apparatus according to claim 1 further comprising means mounted on said frame means for delimbing the longitudinally advancing horizontal trunk of a felled tree.

5. Apparatus according to claim 4 wherein said delimbing means comprises stationary cutter means for underlying the horizontal trunk of a felled tree and for severing limbs therefrom as the trunk is advanced longitudinally.

6. Apparatus according to claim 4 wherein said delimbing means comprises flexible cutter means mounted for movement between a withdrawn position removed from the path of a tree falling onto said cradle means and an operating position at least partially encircling the horizontal trunk of a felled tree, said flexible cutter means severing limbs from the encircled trunk as the same is advanced longitudinally.

7. Apparatus according to claim 1 wherein said trunk advancing means comprises carriage means mounted on said side frame members for oscillation longitudinally thereof, trunk gripping means mounted on said carriage means for movement therewith and for engaging the horizontal trunk of a felled tree to move the engaged trunk toward said shear means upon oscillation of said carriage means, and control means operatively connected to said carriage means and said trunk gripping means for coordinating action thereof.

8. Apparatus according to claim 7 wherein said trunk gripping means comprises a gripping frame member, means for moving said gripping frame member between a retracted position removed from the path of a falling tree and a tree gripping position overlying the generally horizontal trunk of a felled tree, and tooth means on said gripping frame member for gripping the trunk upon movement of said carriage means toward said shear means.

9. A method of harvesting trees comprising the steps of
severing a standing tree adjacent the base thereof with a horizontially positioned shear while felling the severed tree in a generally predetermined direction, then
catching the freely falling tree as the trunk thereof reaches a generally horizontal position,
guiding the trunk of the falling tree into a predetermined position lying along a predetermined longitudinal axis,
pivoting the shear to a generally vertical position, and then
longitudinally advancing the generally horizontal trunk of the felled tree along the longitudinal axis and toward the shear from the generally horizontal position to which the trunk was guided while severing the tree trunk into portions and maintaining the trunk substantially in alignment with the axis to which it was guided on falling.

10. A method according to claim 9 wherein the longitudinal advancing of the trunk of the felled tree comprises reciprocating a carriage in the direction of trunk advancement while alternately gripping and releasing the trunk of the felled tree to move the trunk with the carriage in motion toward the shear and to move the carriage relative to the trunk in motion away from the shear.

11. A method according to claim 10 wherein the reciprocation of the carriage comprises oscillating the carriage through a predetermined distance equal to a desired length of a severed length of the tree trunk.

12. A method according to claim 9 further comprising delimbing the generally horizontal trunk of the felled tree during the longitudinal advancing thereof.

13. A method according to claim 12 wherein the delimbing of the tree trunk comprises engaging the generally horizontal tree trunk with a cutter and severing limbs from the trunk during the longitudinal advancing thereof.

14. A method according to claim 9 further comprising depositing severed portions of tree trunk at a common location adjacent the shear.

* * * * *